UNITED STATES PATENT OFFICE.

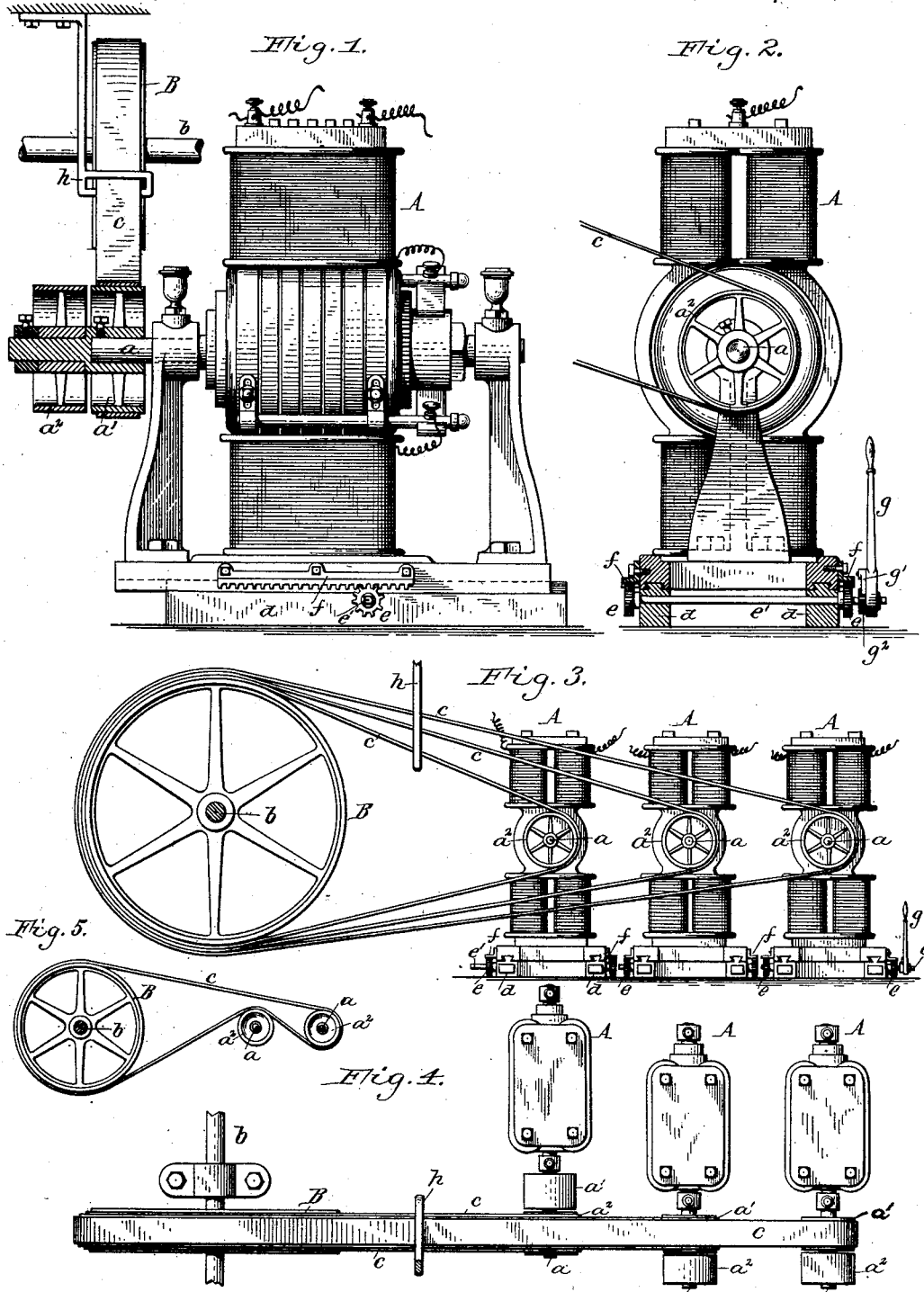

CHARLES W. WALL, OF BUFFALO, ASSIGNOR OF ONE-HALF TO GEORGE URBAN, JR., OF CHEEKTOWAGA, NEW YORK.

BELT-GEARING.

SPECIFICATION forming part of Letters Patent No. 418,775, dated January 7, 1890.

Application filed May 6, 1889. Serial No. 309,674. (No model.)

*To all whom it may concern:*

Be it known that I, CHARLES W. WALL, a citizen of the United States, residing at Buffalo, in the county of Erie and State of New York, have invented new and useful Improvements in Belt-Gearing, of which the following is a specification.

Extensive machinery plants—such, for instance, as those of electric-light establishments—require considerable floor-space, especially when a number of machines are driven from the same line-shaft, in which case it is necessary to provide the driving-shaft of each machine with a tight and a loose pulley to enable one or more machines to be thrown out of gear, if desired, without stopping the other machines connected with the same line-shaft. The high speed at which dynamos or electric machines are run renders it unsafe to shift the driving-belts while the same are in motion, and to avoid all danger it is customary to reduce the speed of the line-shaft before shifting a belt; but this practice is objectionable, as it necessitates a reduction of the speed of all the machines connected with the same line-shaft and involves an unnecessary interruption of some of the machines.

The object of my invention is to provide an improved belt-gearing, whereby one or more machines may be safely thrown out of gear while the machines are running without affecting the other machines, and also to economize floor-space, so that a larger number of machines may be placed in a given area.

The invention consists, to these ends, of the improvements which will be hereinafter fully described, and pointed out in the claims.

In the accompanying drawings, Figure 1 is a front elevation of a dynamo connected with a line-shaft by my improved belt-gearing. Fig. 2 is a side elevation of the machine with its base in section. Fig. 3 is an elevation showing several machines driven from the same pulley by several belts. Fig. 4 is a top plan view of the same parts, showing one of the machines thrown out of gear. Fig. 5 is a diagram showing two machines driven from the same pulley by a single belt.

Like letters of reference refer to like parts in the several figures.

A A A represent a series of dynamos or electric machines, each having a driving-shaft $a$, provided with tight and loose pulleys $a'$ $a^2$.

$b$ represents the main or line shaft; B, a driving-pulley mounted thereon, and $c$ the belts, whereby the shafts of the dynamos are driven from the main shaft. Each machine is made movable in the direction of the axis of its driving-shaft, or, in other words, at right angles to the plane of its driving-belt, so that upon moving the machine laterally in either direction the tight or the loose pulley of its shaft will be connected with the driving-belt $c$ and the machine be driven or stopped. The base of each machine slides upon timbers or ways $d$, secured to the floor of the building, and is preferably connected with said timbers by dovetail ribs and grooves arranged on the respective parts, as shown in the drawings. Each machine is preferably shifted by means of pinions $e$, mounted upon a horizontal shaft $e'$, journaled in the timbers $d$, and meshing with gear-racks $f$, secured to opposite sides of the base of the machine. The shaft $e'$ is turned by a hand-lever $g$, pivoted to the shaft, and having a pawl $g'$, which engages with a ratchet-wheel $g^2$, secured to the shaft.

By moving a machine arranged as herein described, so as to shift its pulleys with reference to its belt, the machine may be thrown in or out of gear while the belt is moving rapidly and without disturbing the position of the belt, thereby avoiding the danger involved in shifting the belt itself and rendering it unnecessary to first reduce the speed of the belt.

When a number of machines are driven from the same shaft, they are placed in groups or series side by side and the machines of each group are arranged in line, one behind the other, as represented in Figs. 3 and 4. The machines of each group are driven from the same driving-pulley B by belts running around the pulleys of the several machines and around the driving-pulley B, one upon the other, as shown in said figures. Each of the machines in such a group is readily thrown out of gear without affecting the other machines or their driving-belts by simply moving the machine laterally, so as to disconnect its tight pulley from the belt and bring its loose pulley into gear therewith, as shown by the innermost machine in Fig. 4. Sufficient room is left between the several groups of machines to permit of this movement of a machine without interfering with the machines of the adjacent groups.

By arranging the machines of one group one behind the other and driving all the machines in the group from the same driving-pulley considerable economy of space is effected, as the groups of machines can be placed very closely together. This arrangement also effects an important saving of pulleys, as but one driving-pulley is required for each group of machines.

A further advantage is gained by running the belts one upon the other on the driving-pulley, as by this arrangement the adhesion between the several belts and between the innermost belt and the driving-pulley is increased and the slip of the belts is lessened.

My improved belt-gearing is especially desirable in electric-light establishments employing a large number of dynamos, as it permits a larger number of machines to be placed in a given area than by the ordinary manner of placing and driving the machines. A guide or loop $h$ is preferably arranged near the driving-pulley B, through which the several belts pass, so as to confine the belts upon said pulley and prevent the same from being shifted off the pulley in moving the machines.

In the modification represented in Fig. 5 a single belt runs around the driving-pulley and around the pulleys of the several machines in each group, which are arranged one behind the other, as in the first-described construction. This arrangement permits one or more machines of the same group to be thrown in and out of gear without affecting the rest, but is not so desirable as the other construction, because the belt is more liable to slip and its contact-surface upon the pulleys is smaller.

I claim as my invention—

1. The combination, with the driving-shaft, the driving-pulley secured thereto, and a driving-belt running around said pulley, of a driven machine transversely movable relatively to the driving-belt and provided with tight and loose pulleys adapted to be connected with said driving-belt, substantially as set forth.

2. The combination, with the driving-shaft, the driving-pulley secured thereto, and the driving-belt running around said pulley, of a driven machine provided with tight and loose pulleys, and ways upon which the machine can be moved transversely to the driving-belt, substantially as set forth.

3. The combination, with the driving-shaft having a driving-pulley, of a series of machines arranged one behind the other, each having a driving-shaft and each made movable in the direction of its shaft, tight and loose pulleys mounted on the shaft of each machine, and separate driving-belts connecting the pulleys of the several machines with said driving-pulley and running around the driving-pulley, one upon the other, substantially as set forth.

Witness my hand this 9th day of April, 1889.

CHAS. W. WALL.

Witnesses:
JNO. J. BONNER,
FRED. C. GEYER.